Dec. 16, 1958    H. J. HARTZ    2,864,399
CONTROLLER
Filed May 11, 1956
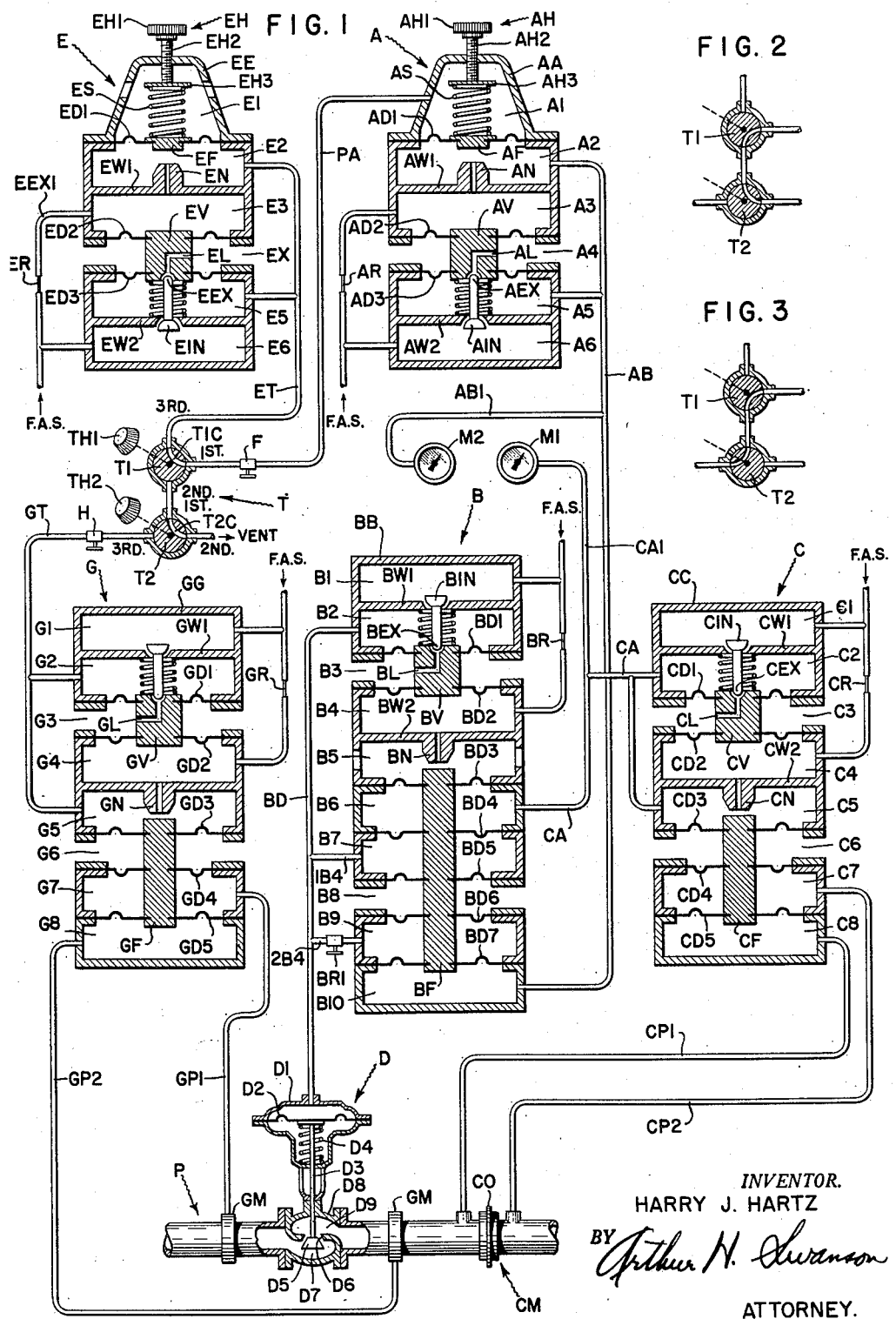
INVENTOR.
HARRY J. HARTZ
BY Arthur H. Swanson
ATTORNEY.

United States Patent Office 2,864,399
Patented Dec. 16, 1958

2,864,399
CONTROLLER

Harry J. Hartz, Philadelphia, Pa., assignor to Minneapolis-Honeywell Regulator Company, Minneapolis, Minn., a corporation of Delaware Application May 11, 1956, Serial No. 584,321

6 Claims. (Cl. 137—486)

This invention relates to means for bringing a final control element from either of its extreme positions of travel into an intermediate, controlling position without a "bump" or distrubance to the process under control and without the necessity of skill and careful attention on the part of the operator.

It is an object of this invention to provide such means including: a controller B adapted to position the final control element D, a first measuring instrument CM responsive to a variable controlled by the final control element, a first transmitter C transmitting to said controller the variations sensed by said first measuring instrument, a second measuring instrument GM responsive to the position of the final control element, a second transmitter G transmitting to said controller the variations sensed by said second measuring instrument to actuate said controller in the direction reverse to that in which said controller is actuated by said first measuring instrument, a manually operable regulator E connected to said controller to operate it in the same direction as said second measuring instrument, and a transfer switch T manually operable to connect said second measuring instrument or said regulator to said controller and to disconnect the other of said second measuring instrument or said regulator from said controller.

More specifically, this invention relates to a pipeline, and especially to means for moving a final control valve in the pipeline from open position to throttling position. In pipelines there is frequently provided at each pumping station, a valve controlling the flow of gas or liquid through the pipeline. When the pumping station is not pumping, this valve should be open in order to minimize the restriction to the flow of fluid through the pipe. When the pumping station is "to go on the line" this valve must be brought into a throttling position in which it controls the flow of fluid through the pipe. In order to bring the valve into throttling position, a controller is provided having a set-point chamber and a measured-variable chamber. A manually operable transfer switch is connected to the set-point chamber of the controller. This transfer switch is manually operable so as to connect a manually operable regulator or a measuring instrument responsive to the position of a final control element to the set-point chamber of the controller. A measuring instrument responsive to a condition controlled by the final control element, in the case of a pipeline, flow, is connected to the measured-variable chamber of the controller.

It is, therefore, a further object of this invention to provide a pipeline having a final control valve and associated apparatus arranged as described in the preceding paragraph.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a diagrammatic or schematic showing of the elements of this invention and of the fluid-conducting pipes which connect them together;

Fig. 2 is a diagram showing the transfer switch in another position to that shown in Fig. 1;

Fig. 3 is a diagram showing the transfer switch in a third position.

GENERAL DESCRIPTION OF THE DEVICE

The device of this invention comprises a pipeline P in which is located a final control element D, shown as a final control valve controlling the flow of gas or liquid through the pipe P. The initial control loop is formed of a first measuring instrument CM, shown as a flow-measuring instrument, responsive to an element controlled by the final control element D. The flow-measuring instrument CM is connected by a transmitter C to the measured-variable chamber of a reversely acting controller B. The controller B is reversely acting only if used with an air-to-open valve as shown in the drawing. A direct acting controller could be used with an air-to-close valve. Controller B, in turn, controls the supply of elastic fluid to the final control element D. Controller B also includes a set-point chamber. A bonnet-loaded pressure regulator A is connected to the set-point chamber of controller B. A transfer switch T is connected to the bonnet of regulator A. Transfer switch T is manually operable so as to connect a manually operable regulator E or a second measuring instrument GM and a second transmitter G to the bonnet of the regulator A and, consequently, to the set-point chamber of controller B. The second measuring instrument GM is responsive to the position of the final control element D and, as shown, is responsive to any difference in pressure on the opposite sides of the final control valve, forming part of final control element D.

GENERAL DESCRIPTION OF OPERATION

Assume that the pump at the pumping station at which final control element D is located is not pumping. The final control element D is open in order to provide as little restriction to the flow of fluid through the pipe P as possible. In order that final control element D be open, a pressure is applied to the set-point chamber of controller B which pressure is greater than any pressure which is put out by the first measuring instrument CM. The set point of controller B is maintained above any pressure which can be set to the measured-variable chamber of controller B by first measuring instrument CM in the following way. Regulator E is manually operated and connected through transfer switch T to the bonnet of bonnet-loaded regulator A so as to maintain the pressure.

Now, if it is desired to move the final control element D into throttling position, the first part T1 of transfer switch T is turned by hand from the position in which it is shown in Fig. 1 into the position in which it is shown in Fig. 2. As a result, the first port of transfer switch T1 is disconnected from the third port and from the manually-operable regulator E and is connected to the second port and to atmosphere through the first and second port of the second part T2 of transfer switch T. This vents the bonnet of regulator A to atmosphere and drops the pressure in the set-point chamber of controller B to atmosphere. This causes the pressure put out by the first measuring instrument CM and fed to the measured-variable chamber of the controller B to be greater than the pressure in the set-point chamber of controller B. Consequently, controller B causes the final control element D to move toward closed position.

Next, the second part T2 of the transfer switch T is turned from the position in which it is shown in Fig. 2 to the position in which it is shown in Fig. 3. In the position in which the parts are shown in Fig. 3, the second or differential-pressure-responsive instrument GM is connected so as to govern the pressure in the set-point chamber of controller B by the following circuit. From the controlled-pressure-chamber G2 of controller G, the air passes through restriction H, the third port of T2, the first port of T2, the second port of T1, the first port of T1, restriction F, to the bonnet or operating-pressure-chamber A1 of regulator A. From the controlled-pressure chamber A5 of regulator A the air under pressure passes through pipe AB to the set-point chamber B10 of controller B. Since controller G is responsive to the position of the final control element D, because controller G is responsive to the pressure on the opposite sides of the final control valve, the controller G causes the pressure in set-point chamber B10 of controller B to increase and to approach the pressure in the measured-variable chamber B6 of controller B. When the pressure in chamber B10 equals the pressure in chamber B6, controller B is in a balanced or throttling position. The pump at the pumping station at which the final control element D is located can then be started.

Second part T2 of transfer switch T is next turned from the position in which it is shown in Fig. 3 to the position in which it is shown in Fig. 2. In the position in which it is shown in Fig. 2, transfer switch T causes the bonnet or loading-pressure chamber A1 of regulator A to be vented to atmosphere through the second port of valve part T2. Shortly thereafter the first part T1 of transfer switch T is turned from the position in which it is shown in Fig. 2 to the position in which it is shown in Fig. 1. In the position in which it is shown in Fig. 1, the transfer switch T connects the manually-operable regulator E to the bonnet A2 of the regulator A. Therefore, regulator E may be manually operable so as to vary the pressure in the set-point chamber B10 of regulator B.

SPECIFIC DESCRIPTION

Final control element D

Final control element D is shown as comprising an air-pressure-operated valve of a well known type. A rigid chamber D1 has one wall thereof formed by a flexible diaphragm or bellows D2 to which is connected a valve stem D3. A spring D4 bears at one end against diaphragm D2 and at the opposite end against the rigid casing D8 containing an inlet chamber D7 and an outlet chamber D9.

Between inlet chamber D7 and outlet chamber D9 is located a stationary valve seat D6 with which cooperates a movable valve D5 located on the end of the valve stem D3. When the pressure of the air applied to diaphragm D2 is greater than the pressure of the spring D4, the valve D5 leaves the valve seat D6. The final control element D is therefore known as air-to-open.

First or flow-measuring instruments CM and C

Instrument CM comprises a plate CO having an orifice through the center of it and located in pipe P. Pipes CP1 and CP2 connect the opposite sides of the orifice plate CO to the chambers C7 and C8 of the instrument C respectively. The instrument C comprises a controller and transmitter of the stack type. A rigid casing CC is divided into eight chambers C1—C8 by rigid walls CW1 and CW2 and by flexible diaphragms CD1—CD5. Diaphragms CD1, CD2, CD3 and CD5 are intended to apply pressure and are relatively large while diaphragm CD4 is merely a sealing diaphragm and is relatively small. Diaphragm CD1 is smaller than diaphragm CD2 because the pressure in chamber C2 is intended to be greater than the pressure in chamber C4. Diaphragms CD3, CD4 and CD5 are connected together by a rigid rod CF, the upper end of which cooperates as a flapper with nozzle CN. Diaphragms CD1 and CD2 are connected together by a rigid rod CV having an L-shaped port CL passing through it. Compressed air from a supply of filtered air (F. A. S.) is led directly to chamber C1 and, through restriction CR, to chamber C4, which communicates with one end of nozzle CN. Wall CW1 separates inlet chamber C1 from the controlled-pressure chamber C2. Wall C1 has a central opening in it with which an inlet valve CIN cooperates. An exhaust valve CEX cooperates with the upper end of the L-shaped orifice CL.

Operation of flow measuring instruments CM and C

Assume that the flow through pipe P is at a certain level and that the pressure in chamber C7 is at a corresponding ratio with respect to the pressure in chamber C8. If the flow through pipe P changes, this will cause the ratio of these pressures to change. Consequently, the difference between the pressures on the opposite sides of diaphragm CD5 will cause flapper CF to move longitudinally of controller C. This varies the distance between the upper end of flapper CF and the lower end of nozzle CN and, consequently, varies the flow of air through nozzle CN. This causes a change in pressure in the air in chamber C4 and a change of the air pressure on diaphragm CD2. This causes valve CF to move longitudinally of controller C and to open either exhaust valve CEX or inlet valve CIN. If exhaust valve CEX opens by moving away from the upper end of valve CV, L-shaped passage CL is opened and air escapes from chamber C2 through the L-shaped passage CL to the chamber C3, which is open to atmosphere. If the inlet valve CIN opens, air is fed from the source of supply F. A. S. through chamber C1 and inlet valve CIN to controlled-air chamber C2. Chamber C2 is connected to chamber C5 which is the negative-feedback chamber.

Connection CA

The controlled-air chamber C2 of controller C is connected by means of outlet pipe CA with the measured-variable chamber B6 of controller B. Branch CA1 of pipe CA connects with an indicator or recorder M1.

Controller B

Controller B is of the stack type. A rigid casing BB is divided into ten compartments B1—B10 by rigid walls BW1 and BW2 and by flexible diaphragms BD1—BD7. Diaphragms BD3, BD5, and BD6 are sealing diaphragms and are relatively small. Diaphragms BD1, BD2, BD4, and BD7 are intended to apply the pressure of the air in the chambers of which these diaphragms form walls and are relatively large. Diaphragm BD1 is smaller than diaphragm BD2 because the pressure in chamber B2 is intended to be greater than the pressure in chamber B4.

Diaphragms BD3—BD7 are connected to a rod BF which is located centrally of the controller B. The upper surface of rod BF serves as a flapper in cooperation with the nozzle BN, which forms the end of a passage through wall BW2.

A valve BV is mounted on diaphragms BD1 and BD2 and has an L-shaped opening BL through it.

Through wall BW1 passes an orifice with which cooperates an inlet valve BIN which is connected to an exhaust valve BEX, which cooperates with the upper end of the L-shaped passage BL.

Air from a filtered source of air under pressure F. A. S. is fed directly to inlet chamber B1 and, through restriction BR, to chamber B4. The output of controller B is fed from controlled-pressure chamber B2 through pipe BD to the motor of final control element D. A branch 1BD connects the output of controller B to the negative-feedback chamber B7. A second branch conduit 2BD containing a restriction BR1 connects the output of controller B to the positive-feedback chamber B9. Because of restriction BR1, chamber B9 is the reset chamber of controller B.

*Operation of controller B*

Since the pressure in chamber B6 tends to move flapper BF away from the nozzle BN and therefore to cause a decrease in the output pressure of the controller, controller B is reverse acting.

When the pressure in chamber B6 equals the pressure in chamber B10 and the pressure in chamber B7 equals the pressure in chamber B9, the controller is at rest or in its balanced condition.

Assume that the pressure in chamber B6 or the pressure in chamber B10 changes, this causes an unbalanced force to be applied to the flapper BF. Consequently, flapper BF moves relative to nozzle BN and varies the flow of air through nozzle BN and the pressure of the air in chamber B4. Consequently, diaphragm BD2 moves valve BV and opens either exhaust valve BEX or inlet valve BIN. If inlet valve BIN opens, air is fed from source F. A. S. through inlet chamber B1 to controlled-pressure chamber B2. If exhaust valve BEX opens, air escapes from controlled-pressure chamber B2 through the L-shaped conduit BL and chamber B3, which is open to atmosphere.

*Second or differential-pressure-responsive instruments GM and G*

The construction and mode of operation of differential-pressure-responsive instruments GM and G are substantially identical with those of the first or flow-measuring instruments CM and C. The equivalent elements of instrument G and of instrument C have been given the same reference characters with a G substituted for a C.

It is believed that no more detailed explanation of instrument G is required.

Instrument G is responsive to any difference in pressure in the pipe P on the opposite sides of the final control element D. This is accomplished by connecting chambers G6 and G7 of controller G with the pipe P by means of pipes GP1 and GP2, respectively.

*Connection between instrument G and transfer switch T*

The controlled-air chamber G2 of instrument G is connected to transfer switch T by means of a pipe GT containing a manually operable restriction H, which may readily be a needle valve.

*Structure of bonnet-loaded pressure regulator A*

Regulator A is of the stack type. The rigid casing AA is divided into six chambers A1—A6 by flexible diaphragm AD1—AD3 and by rigid walls AW1 and AW2. Diaphragms AD1 and AD2 apply pressure and are relatively small. Diaphragm AD3 is relatively large. Because it is desired to have the pressure of the air in chamber A5 greater than the pressure of the air in chamber A3.

A manually operable handle AH is adjustably mounted in the upper end of casing AA. Handle AH comprises a knurled disc AH1, a screw threaded stem AH2, and a disc AH3. Stem AH2 is received in screw threads in the end of rigid casing AA.

A spring AS bears, at its upper end, against disc AH3 and, at its lower end, against diaphragm AD1.

A flapper AF is mounted on diaphragm AD1 and cooperates with a nozzle AN forming one end of a port located in wall AW1 and connecting chambers A2 and A3.

Diaphragms AD2 and AD3 support a valve AV having a port AL of inverted L-shape through it.

A port passes centrally through wall AW2 and cooperates with an inlet valve AIN. An exhaust valve AEX cooperates with the lower end of port AL.

Air is fed from a source of filtered air under pressure F. A. S. directly to inlet chamber A6 and, through restriction AR, to chamber A3. Chamber A2 is a negative-feedback chamber and is connected to controlled-pressure chamber A5.

*Operation of regulator A*

The pressure of the air in bonnet or chamber A1 is applied to diaphragm AD1. The pressure of spring AS, as adjusted by handle AH, is also applied to diaphragm AD1. The pressure of the air in chamber A2 is equal to the pressure of the air in chamber A1 plus the pressure of spring AS. Since the air is supplied from source F. A. S. through restriction AR, the position of flapper AF relative to nozzle AN governs the pressure of the air in chamber A3. The pressure of the air in chamber A3 is applied to diaphragm AD2. If the pressure of the air in chamber A3 changes, diaphragm AD2 opens inlet valve AIN or opens exhaust valve AEX. If inlet valve AIN opens, air from a source F. A. S. passes from inlet chamber A6 to controlled-air chamber A5. If exhaust valve AEX opens, air passes from controlled-air chamber A5 through L-shaped port AL to chamber A4, which is open to atmosphere.

*Connections between controller B, regulator A and transfer switch T*

The controlled-air chamber A5 of regulator A is connected by pipe AB with the set-point chamber B10 of controller B. A branch pipe AB1 connects this controlled air with an indicator or recorder M2.

*Second or manually-operable pressure regulator*

The construction and mode of operation of second or manually-operable air-pressure-regulator are substantially identical with those of the first or bonnet-loaded pressure regulator A. The equivalent elements of regulator E and of regulator A have been given the same reference characters with an E substituted for an A.

The difference between regulators A and E is that chamber E1 of regulator E is vented to atmosphere. Therefore diaphragm ED1 is responsive to the pressure of spring ES on one side and to the pressure of the air in chamber E2 on the other.

It is believed that no more detailed explanation of regulator E is required.

*Connection between transfer switch T and regulator A*

Pipe PA connects transfer switch T with the bonnet chamber A1 of regulator A. A manually adjustable restriction F, which may well be a needle valve, is located in pipe PA.

*Structure of transfer switch T*

Transfer switch T is illustrated diagrammatically. Transfer switch T may be a plug valve having a casing with ports through it and enclosing a pair of rotatable plugs each having a conduit through it adapted to connect and disconnect the various ports.

Transfer switch T has a first part having first, second, and third ports. With these ports cooperates a plug T1 rotatable by means of a handle TH1 and containing a conduit T1C adapted to connect and disconnect the various ports, as is shown in Figs. 1, 2, and 3.

Transfer switch T has a second part having first, second and third ports. With these ports cooperates a plug T2 rotatable by means of a handle TH2 and containing a conduit 72C adapted to connect and disconnect the various ports.

*Operation of restrictions F and H*

Because of their resistance to the flow of fluid through them, restrictions F and H prevent sudden, large changes in pressure from being fed to the set-point chamber B10 of the controller B. Restrictions F and H should be adjusted manually to offer such a resistance to the flow of fluid through them as to prevent cycling of the device during the time when the second or differential-pressure-responsive measuring instrument GM is loading the bonnet of the regulator A.

While, in accordance with the provisions of the statutes, there has been illustrated and described the best forms of the embodiments of the invention known, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described the invention, what is claimed as new and for which it is desired to secure by Letters Patent is:

1. Means for moving a final control valve from open position to a throttling position intermediate its range of movement, including, a motor connected to the final control valve to move said valve toward open position as the pressure of an elastic fluid applied to said motor is increased, a controller having a first chamber connected to decrease the pressure of the fluid put out by said controller as the pressure of the fluid applied to said first chamber is increased and vice versa and a second chamber operating in the opposite sense to said first chamber, a first instrument measuring the flow of fluid through the final control valve, a first transmitter operated by said first instrument to increase the pressure of the fluid put out by said first transmitter as the flow of fluid through the final control valve increases and vice versa, a conduit for fluid connecting said first transmitter to said first chamber of said controller, a second instrument measuring the difference in pressure of the fluid on the opposite sides of the final control valve, a second transmitter operated by said second instrument to increase the pressure of the fluid put out by said second transmitter as the difference in pressure of the fluid on opposite sides of the final control valve increases and vice versa, a second restriction connected on its inlet side to the output of said second transmitter, a manually operable transfer switch having two parts, the second of said parts having a third port connected to the outlet side of said second restriction and a second port communicating with atmosphere and a first port connected to the first part of said transfer switch, the first of said parts having first, second, and third ports, the second port of said first part being connected to said first port of said second part, said first and second parts being manually operable to connect said first port of said first part to said second or to said third port of said first part and to connect said first port of said second part to said second or to said third port of said second part, a second regulator manually operable to vary the pressure of the fluid put out by said second regulator, the output for fluid from said second regulator being connected to said third port of said first part of said transfer switch, a first restriction connected on its inlet side to said first port of said first part of said transfer switch, a first regulator having an inlet chamber connected to the outlet side of said first restriction and operable in response to changes in the pressure of the fluid in said inlet chamber to vary the pressure of the fluid put out by said first regulator, a conduit for fluid connecting the outlet of said first regulator to said second chamber of said controller, and a conduit for fluid connecting the outlet of said controller to said motor.

2. Means for bringing a final control element from either of its extreme positions into an intermediate, controlling position, including, an elastic-fluid-pressure-operated motor actuating the final control element over a range of movement, a controller varying the pressure of the fluid fed to said motor in response to any difference between a first pressure and a second pressure applied to said controller, a first measuring element responsive to a variable controlled by the final control element, a first transmitter responsive to said first measuring element to vary said first pressure, a second measuring element responsive to the position of the final control element, a second transmitter responsive to said second measuring element to vary said second pressure, a manually-operable elastic-fluid-pressure regulator varying said second pressure, a first conduit for elastic fluid connecting said first transmitter so as to conduct said first pressure to said controller, and a transfer switch manually operable to connect said second transmitter so as to conduct said second pressure to said controller and to disconnect said regulator from said controller or vice versa, and a manually operable restriction between said transfer switch and said controller.

3. Means for bringing a final control element from either of its extreme positions into an intermediate, controlling position, including, an elastic-fluid-pressure-operated motor actuating the final control element over a range of movement, a controller varying the pressure of the fluid fed to said motor in response to any difference between a first pressure and a second pressure applied to said controller, a first measuring element responsive to a variable controlled by the final control element, a first transmitter responsive to said first measuring element to vary said first pressure, a second measuring element responsive to the position of the final control element, a second transmitter responsive to said second measuring element to vary said second pressure, a manually operable elastic-fluid-pressure regulator varying said second pressure, a first conduit for elastic fluid connecting said first transmitter so as to conduct said first pressure to said controller, and a transfer switch manually operable to connect said second transmitter so as to conduct said second pressure to said controller and to disconnect said regulator from said controller or vice versa, and manually operable restriction connected between said second transmitter and said transfer switch.

4. Means for bringing a final control element from either of its extreme positions into an intermediate, controlling position, including, an elastic-fluid-pressure-operated motor actuating the final control element over a range of movement, a controller varying the pressure of the fluid fed to said motor in response to any difference between a first pressure and a second pressure applied to said controller, a first measuring element responsive to a variable controlled by the final control element, a first transmitter responsive to said first measuring element to vary said first pressure, a second measuring element responsive to the position of the final control element, a second transmitter responsive to said second measuring element to vary said second pressure, a manually-operable elastic-fluid-pressure regulator varying said second pressure, a first conduit for elastic fluid connecting said first transmitter so as to conduct said first pressure to said controller, and a transfer switch manually operable to connect said second transmitter so as to conduct said second pressure to said controller and to disconnect said regulator from said controller or vice versa, and a bonnet-loaded elastic-fluid-pressure regulator connected between said transfer switch and said controller and operable in response to said manually-operable elastic-fluid-pressure regulator or in response to said second transmitter to vary said second pressure.

5. Means for bringing a final control element from either of its extreme positions into an intermediate, controlling position, including, an elastic-fluid-pressure-operated motor actuating the final control element over a range of movement, a controller varying the pressure of the fluid fed to said motor in response to any difference between a first pressure and a second pressure applied to said controller, a first measuring element responsive to a variable controlled by the final control element, a first transmitter responsive to said first measuring element to vary said first pressure, a second measuring element responsive to the position of the final control element, a second transmitter responsive to said second measuring element to vary said second pressure, a manually-operable elastic-fluid-pressure regulator varying said second pressure, a first conduit for elastic fluid connecting said first transmitter so as to conduct said first pressure to said controller, and a transfer switch manually operable to connect said second transmitter so as to conduct said second pressure to said controller and to disconnect said regulator from said controller or vice versa, and said transfer switch having two parts, one of said parts being operable to connect said controller to said manually-operable elastic-pressure-regulator or to the other of said parts, and the other of said parts being operable to connect said one part to said second transmitter or to atmosphere.

6. Means for bringing a final control element from either of its extreme positions into an intermediate, controlling position, including, an elastic-fluid-pressure-operated motor actuating the final control element over a range of movement, a controller varying the pressure of the fluid fed to said motor in response to any difference between a first pressure and a second pressure applied to said controller, a first measuring element responsive to a variable controlled by the final control element, a first transmitter responsive to said first measuring element to vary said first pressure, a second measuring element responsive to the position of the final control element, a second transmitter responsive to said second measuring element to vary said second pressure, a first manually-operable elastic-fluid-pressure regulator varying said second pressure, a first conduit for elastic fluid connecting said first transmitter so as to conduct said first pressure to said controller, a transfer switch manually operable to connect through a second conduit said second transmitter and controller so as to conduct said second pressure to said controller and to disconnect said first regulator from said controller and vice versa, and a second manually-operable elastic-fluid-pressure regulator varying said second pressure and connected in said second conduit between said transfer switch and said controller.

References Cited in the file of this patent

UNITED STATES PATENTS

| | | |
|---|---|---|
| 1,962,676 | Albright | June 12, 1934 |
| 1,977,559 | Lewis | Oct. 16, 1934 |
| 2,311,853 | Moore | Feb. 23, 1943 |
| 2,662,509 | Fellows | Dec. 15, 1953 |
| 2,741,261 | Wissenborn | Apr. 10, 1956 |